United States Patent
Downey et al.

(10) Patent No.: US 7,227,341 B2
(45) Date of Patent: Jun. 5, 2007

(54) CIRCUIT FOR USE WITH SWITCHED LEG POWER SUPPLY

(75) Inventors: Walter J. Downey, Los Gatos, CA (US); Jacques H. Wilson, II, Carmel Valley, CA (US)

(73) Assignee: Echelon Corporation, San Jose, CA (US)

( * ) Notice: Subject to any disclaimer, the term of this patent is extended or adjusted under 35 U.S.C. 154(b) by 241 days.

(21) Appl. No.: 11/039,248

(22) Filed: Jan. 18, 2005

(65) Prior Publication Data

US 2006/0158171 A1 Jul. 20, 2006

(51) Int. Cl.
*G05F 1/613* (2006.01)

(52) U.S. Cl. ........................ 323/223; 323/239; 315/126

(58) Field of Classification Search ................ 315/126; 323/223, 233, 239, 324
See application file for complete search history.

(56) References Cited

U.S. PATENT DOCUMENTS

| | | | | |
|---|---|---|---|---|
| 4,300,090 A | * | 11/1981 | Weber ........................ 323/311 |
| 4,713,598 A | * | 12/1987 | Smith ......................... 323/245 |
| 4,870,340 A | * | 9/1989 | Kral ........................... 323/235 |
| 4,918,690 A | * | 4/1990 | Markkula et al. ........... 370/400 |
| 4,948,987 A | * | 8/1990 | Weber ......................... 307/36 |
| 5,247,242 A | * | 9/1993 | Yamaguchi et al. ........ 323/324 |
| 5,327,047 A | * | 7/1994 | Gershen ..................... 315/194 |
| 5,455,491 A | * | 10/1995 | Hajagos et al. ............. 315/291 |
| 6,043,635 A | * | 3/2000 | Downey ..................... 323/282 |
| 6,771,056 B1 | * | 8/2004 | Lindemann ................. 323/324 |
| 6,831,447 B1 | * | 12/2004 | Wittenberg ................. 323/222 |

* cited by examiner

*Primary Examiner*—Jeffrey Sterrett
(74) *Attorney, Agent, or Firm*—Blakely, Sokoloff, Taylor & Zafman LLP (57) ABSTRACT

A circuit for use with a power supply coupled in a switched leg of, for example, a lighting circuit, is described. The circuit provides a low impedance near the zero crossing of the AC signal and a high impedance thereafter, thereby allowing the power supply to draw current that bypasses, for instance, a light bulb.

31 Claims, 6 Drawing Sheets

FIG. 5A (LIGHT ON)

FIG. 5B (LIGHT ON)

FIG. 5C (LIGHT ON)

FIG. 6A (LIGHT OFF)

FIG. 6B (LIGHT OFF)

FIG. 6C (LIGHT OFF)

CIRCUIT FOR USE WITH SWITCHED LEG POWER SUPPLY

FIELD OF THE INVENTION

The invention relates to the field of power supplies which draw current in an AC switched leg.

PRIOR ART AND RELATED ART

It is sometimes necessary to provide current for a power supply in a switched leg. For instance, in a typical AC switch for a light bulb, DC power may be needed for operating a communications device such as described in U.S. Pat. No. 4,918,690. In switched leg circuits, the only current path between the source of AC power and ground is through the light bulb or similar load. Consequently, when power is required, current must be drawn through the load to obtain this power. If the load is off, too much current through a bulb or other source of illumination may cause the bulb to appear lighted, especially in the dark. When the load is on, a mechanism must be provided to assure some voltage drop at the power supply, otherwise all the power will be consumed at the load, leaving nothing at the power supply.

Switched leg power supplies are known in the prior art, see for example, U.S. Pat. Nos. 4,713,598 and 6,043,635.

Some difficulties encountered in switched leg power supplies occur when the bulb is burned out or the primary power line potential is 240 volts AC. The resistance through a typical incandescent bulb is relatively high to accommodate this higher voltage. Drawing current through such bulbs even in the range of, for example, 100 milliamps can cause noticeable illumination. Additionally, for sources of illumination using electronic or magnetic ballast, the prior art power supplies do not operate well, if at all.

One prior are solution is to add a parallel impedance with a passive device across the source of illumination. For instance, a capacitor of 2-3 microfarads can be placed across the incandescent light. However, this does not work well.

SUMMARY OF THE INVENTION

A circuit for coupling across a load in an AC switched leg where a power supply draws current from the leg. When the load is on or off, the circuit provides a low resistance across the load when the power supply is drawing current, thereby reducing current in the load. When the load is on, the circuit provides a relatively high impedance for most of a typical AC cycle, and consequently, does not significantly affect the performance of the load.

DETAILED DESCRIPTION

A circuit for coupling across a load such as a source of illumination in a switched leg is described. In the following description, numerous specific details are set forth such as specific circuit components and associated potentials, in order to provide a thorough understanding of the present invention. It will be apparent to one skilled in the art, that the present invention may be practiced without these specific details. In other instances, well-known electrical circuit designs and implementations are not described in detail in order to not unnecessarily obscure the present invention.

Figure 1:
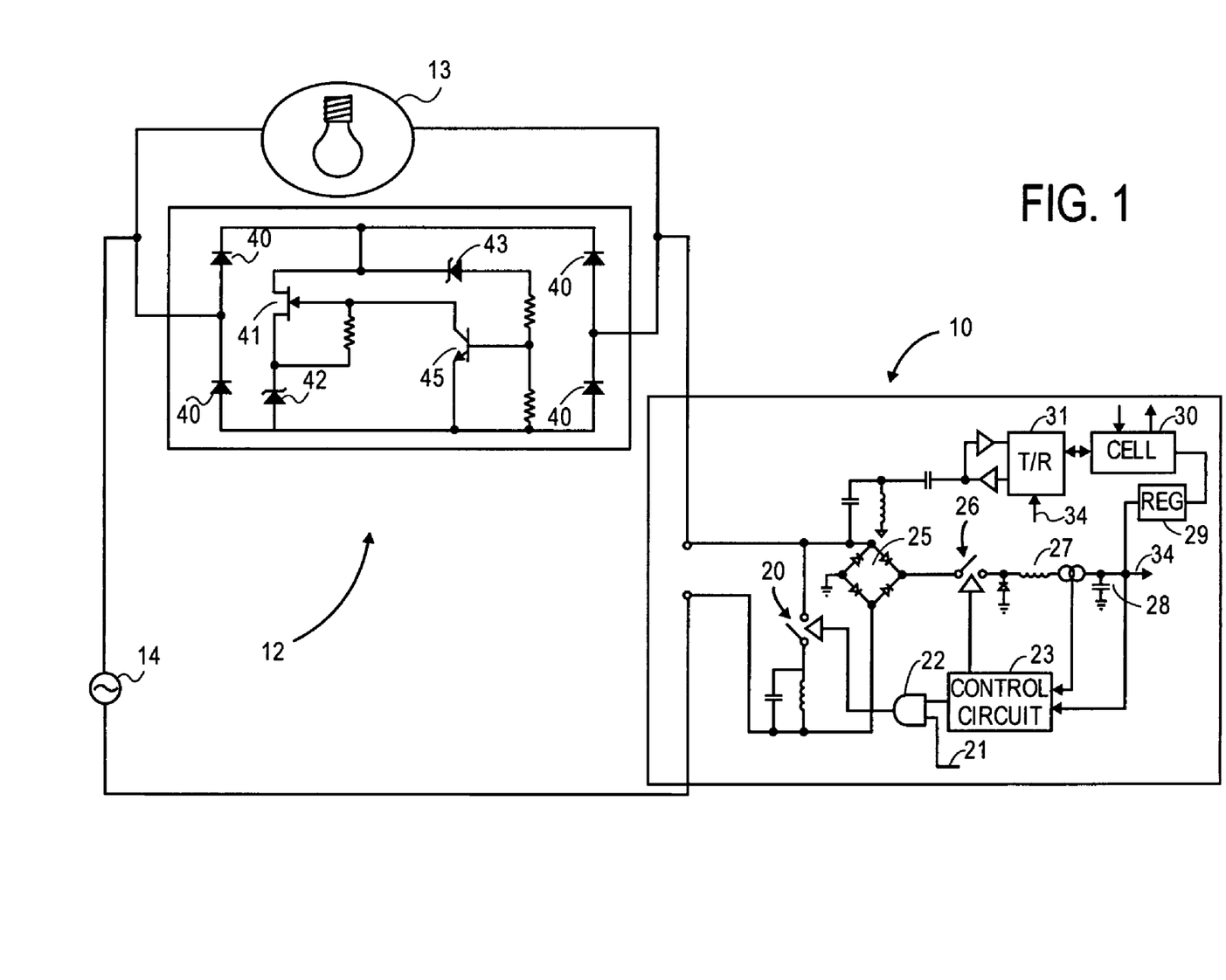
FIG. 1 is an electrical schematic showing a switched leg power supply in conjunction with a circuit built in accordance with the present invention coupled across a source of illumination.

Referring now to FIG. 1, a switched leg power supply 10 such as described in U.S. Pat. No. 6,043,635 is shown, coupled in a switched leg arrangement with a light bulb 13. A source of AC power 14 is illustrated. The circuit 12, as will be described in accordance with the present invention, provides a low impedance in a first range of the AC cycle, and a higher impedance in a second range of the AC cycle. The first impedance is a low impedance that allows the power supply 10 to charge, preferably at or near the zero crossing of the AC cycle and shunts current around the load. The higher impedance is present for the majority of the AC cycle when most of the power is delivered to the load (bulb 13). It should be noted from FIG. 1, that all the power drawn by the power supply 10, but for the circuit 12, must pass through the bulb 13.

The power supply 10 is described in more detail in the above-referenced patent. Briefly however, it includes a triac 20 which receives a dimmer control signal on line 21. The triac 20 controls the illumination of the bulb 13; it allows the bulb to be turned on, or off, or illuminated at some intermediate intensity.

AC power is applied across the full rectifier 25 and when the switch 26 is closed, power is stored in the inductor 27 and the capacitor 28. This DC power may be used on line 34 by a transmitter/receiver 31 which sends communication signals over the power line. These communication signals are processed within the cell 30 which provides, by way of example, control signals to control the dimmer over line 21. The power from the inductor 27 and capacitor 28 is also regulated by the regulator 29 to provide regulated power to the cell 30.

As described in the above-referenced patent, during a first part of the AC cycle, the switch 26 closes, allowing the inductor 27 and capacitor 28 to receive current. The closing of the switch 26 is controlled by the control circuit 23. The switch 26 is typically closed for a short period of time, near the zero crossing of the AC cycle, for instance, between 0-20 volts of the rectified AC waveform. With the power supply 10, when the bulb 13 is illuminated, the triac 20 is closed. In its closed position, there is insufficient voltage drop across the triac 20 to allow the inductor 27 and capacitor 28 to charge. Consequently, the control 30 through the AND gate 22 allows the triac 20 to open at approximately the same time that the switch 26 is closed to allow current to flow into the inductor and capacitor. Thereafter, if the bulb 13 is to be illuminated, the control circuit 23 allows the triac 20 to close and power to be drawn through the bulb 13.

The circuit 12 of FIG. 1 includes a depletion mode, field-effect transistor 41 with a source terminal coupled to a Zener diode 42. The diode 42 and transistor 41 are coupled across a full wave rectifier comprising the diodes 40. The rectifier rectifies the AC signal across the bulb 13. The drain terminal of the transistor 41 is connected, through a second Zener diode 43 and resistor, to the base terminal of a bipolar transistor 45. The transistor 45 has its collector terminal coupled to the gate terminal of the transistor 41 and its emitter terminal coupled to one terminal of the Zener diode 42.

In operation, the diodes 40 rectify the AC signal from the source 14 and provide a fully rectified, positive waveform to the drain terminal of transistor 41. At the beginning of an AC cycle, a potential builds across the bulb 13 and is rectified by the diodes 40. The transistor 41 begins conducting since it is a depletion mode device. As the potential continues to build across the bulb 13, eventually, the Zener diode 43 conducts. This causes the bipolar transistor 45 to conduct, pulling the gate of transistor 41 low. This stops the transistor 41 from conducting, and moreover, with the diode 42 conducting, the source terminal is maintained low enough so that transistor 41 is completely off. For instance, if the Zener diode 42 conducts at 5 volts, a −5 volts provided by the diode 42 assures that the transistor 41 is off. Also, by way of example, the diode 43 can begin conducting at 10 volts, and before it conducts the low impedance path through the transistor 41, allows the current to substantially bypass bulb 13. Thus, the inductor 27 and capacitor 28 can receive current from the source 14 without it being drawn through the bulb 13. Once transistor 41 ceases to conduct, the circuit 12 has a very high impedance relative to the bulb 13, and all the current is then shunted to the bulb 13, when the triac 20 is closed.

Figure 5A:
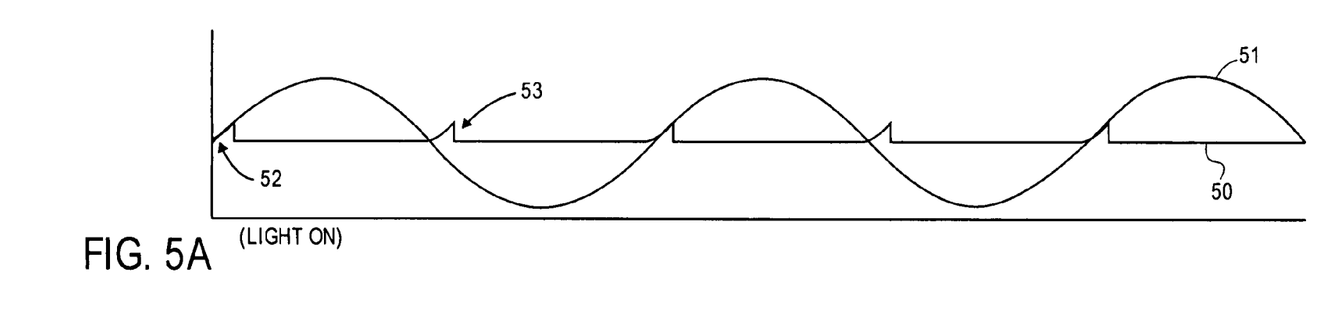
FIGS. 5A, B and C illustrates waveforms associated with the schematic of FIG. 1 when the light bulb is illuminated.

Referring to FIG. 5A, the waveform 50 represents the current through the transistor 41 of FIG. 1 that is supplied to the power supply when the bulb is illuminated. The waveform 50 is at a zero level except for the pulses. At the beginning of the AC cycle, shown at 52, along the AC waveform 51, the transistor 41 briefly conducts and then is shut off when the bipolar transistor 45 conducts. This again occurs half way through the AC cycle, as shown by the pulse 53. Note, the waveform 51 is the unrectified AC signal.

Figure 5B:
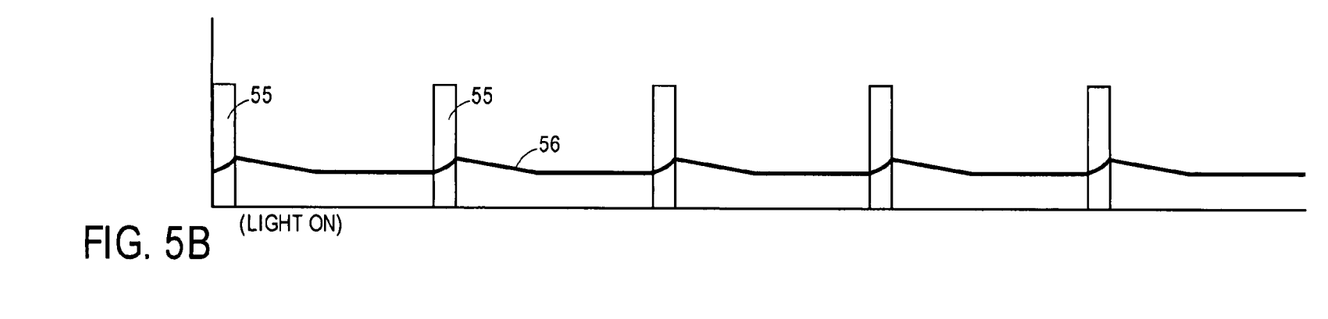
Figure 5C:
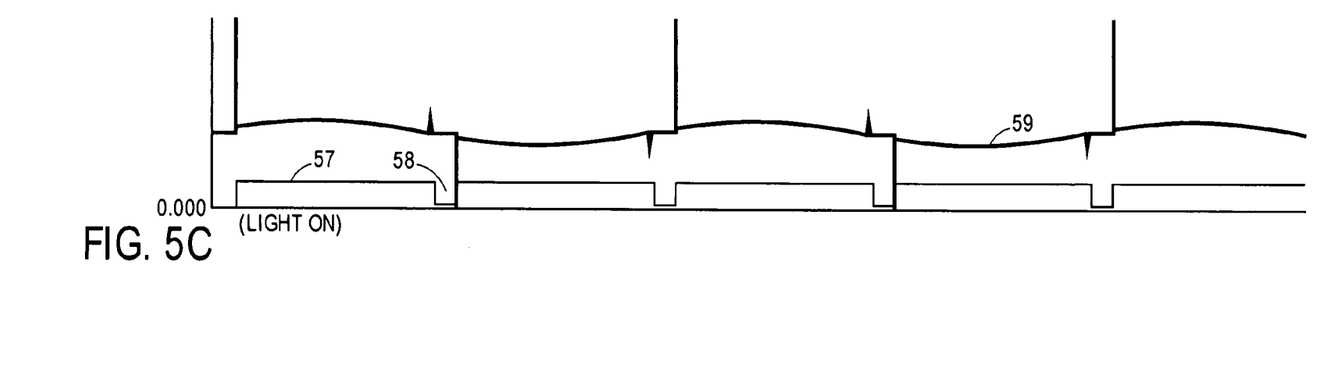

In FIG. 5B, the pulses 55 represent the closing of the switch 26 under control of the circuit 23. The waveform 56 is the current in the inductor 27. Each time the switch 26 closes, as shown by the pulses 55, the current through the inductor increases and then begins to die down between the switch closures. In FIG. 5C, the waveform applied to the control terminal of the triac 20 is illustrated as waveform 57. The amplitude of waveform 57 between the negative pulses 58 is high enough to cause the triac 20 to conduct. At the negative pulses 58, the triac is opened and ceases to conduct, allowing the current to be diverted to the inductor and capacitor, near the zero crossing of the AC waveform. This coincides with the current pulses 52 and 53 through the circuit 12. The waveform 59 is the current in the triac for the condition when the bulb is on. For the most part, the current follows the AC waveform, however, there are spikes associated with the triac's turning off and on.

While in FIG. 5A the current through the circuit 12 is substantially aligned with the current in the inductor (waveform 56 and the pulses 55 of FIG. 5B), as well as the negative pulses 58 and the waveform 57 of FIG. 5C this may not always be the case. Some misalignment caused by phase shifting of the AC signal may occur. As an example, where instead of a bulb 13, a fluorescent tube is used along with a ballast, the load will be somewhat reactive causing a shift in the waveform. This however, does not change the overall operation of the circuit as described since the turning on and off of the various devices need not be precisely synchronized.

Figure 6A:
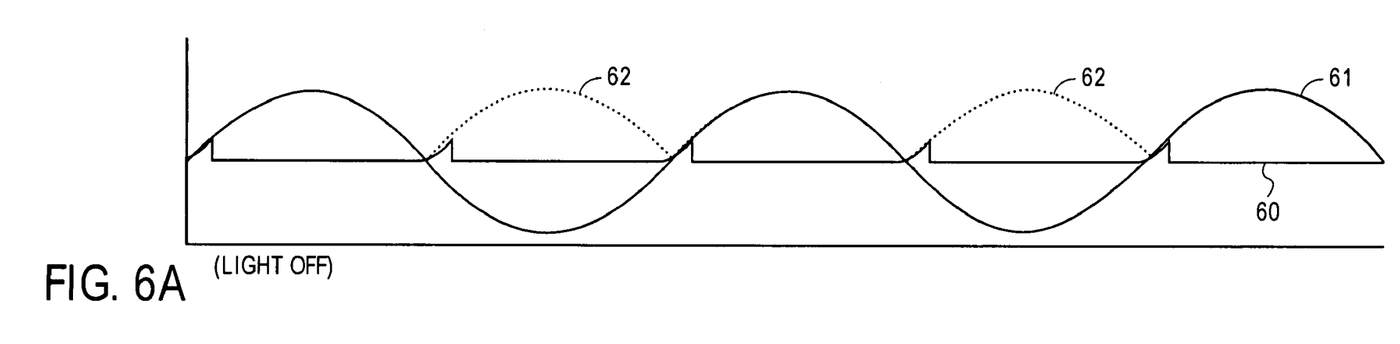
FIGS. 6A, B and C illustrates waveforms associated with the schematic of FIG. 1 when the light bulb is off.
Figure 6B:
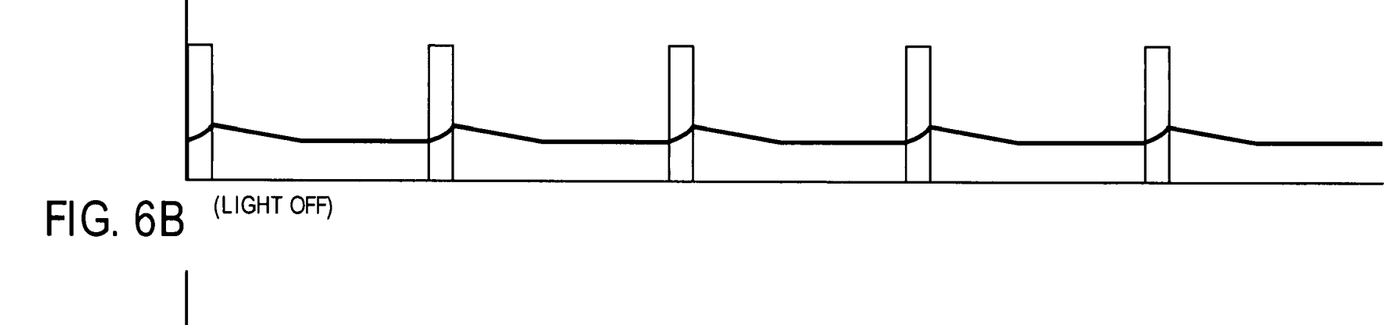
Figure 6C:
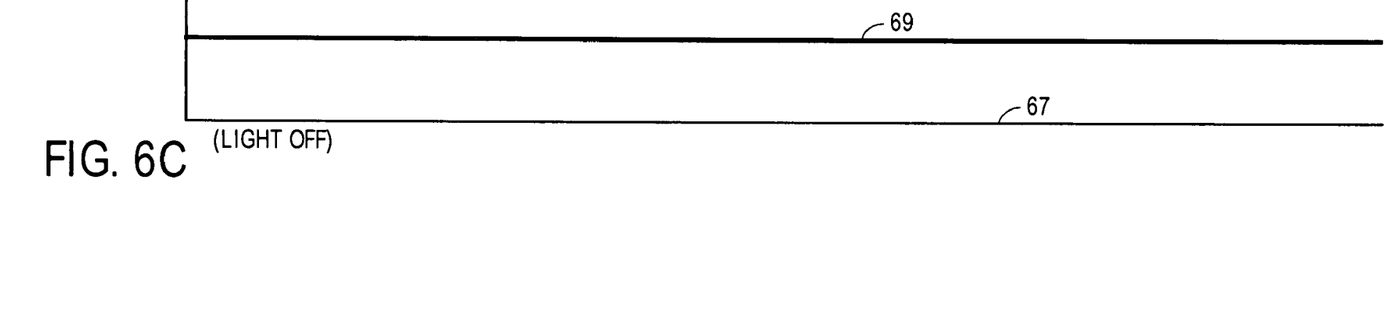

In FIGS. 6A, B and C, the waveforms for the schematic of FIG. 1 are shown for the condition when the light is off. The triac 20 is open at all times. The current waveform 60 of FIG. 6A is the same as the waveform 50 of FIG. 5A. The waveform 61 again is the AC waveform applied to the circuits 10 and 12. The dotted lines 62 represent the rectified waveform at the output of bridge 25. The pulses in the waveform 60 are the current pulses through the power supply 10. The waveforms of FIG. 6B are the same as FIG. 5B. When the light is off, the circuit 12 is a low impedance, thus allowing the current substantially bypass the bulb. Thus, as seen from the standpoint of the inductor 27 and capacitor 28, it makes no difference if the light is on, or off, for the condition where all the waveforms are aligned. In FIG. 6C, the line 67 (0 volts) represents the voltage applied to the triac's control terminal. This is substantially zero since the triac is not conducting. The line 69 represents the current through the triac 20, this is zero current for the level shown, since the triac is open.

Figure 2:
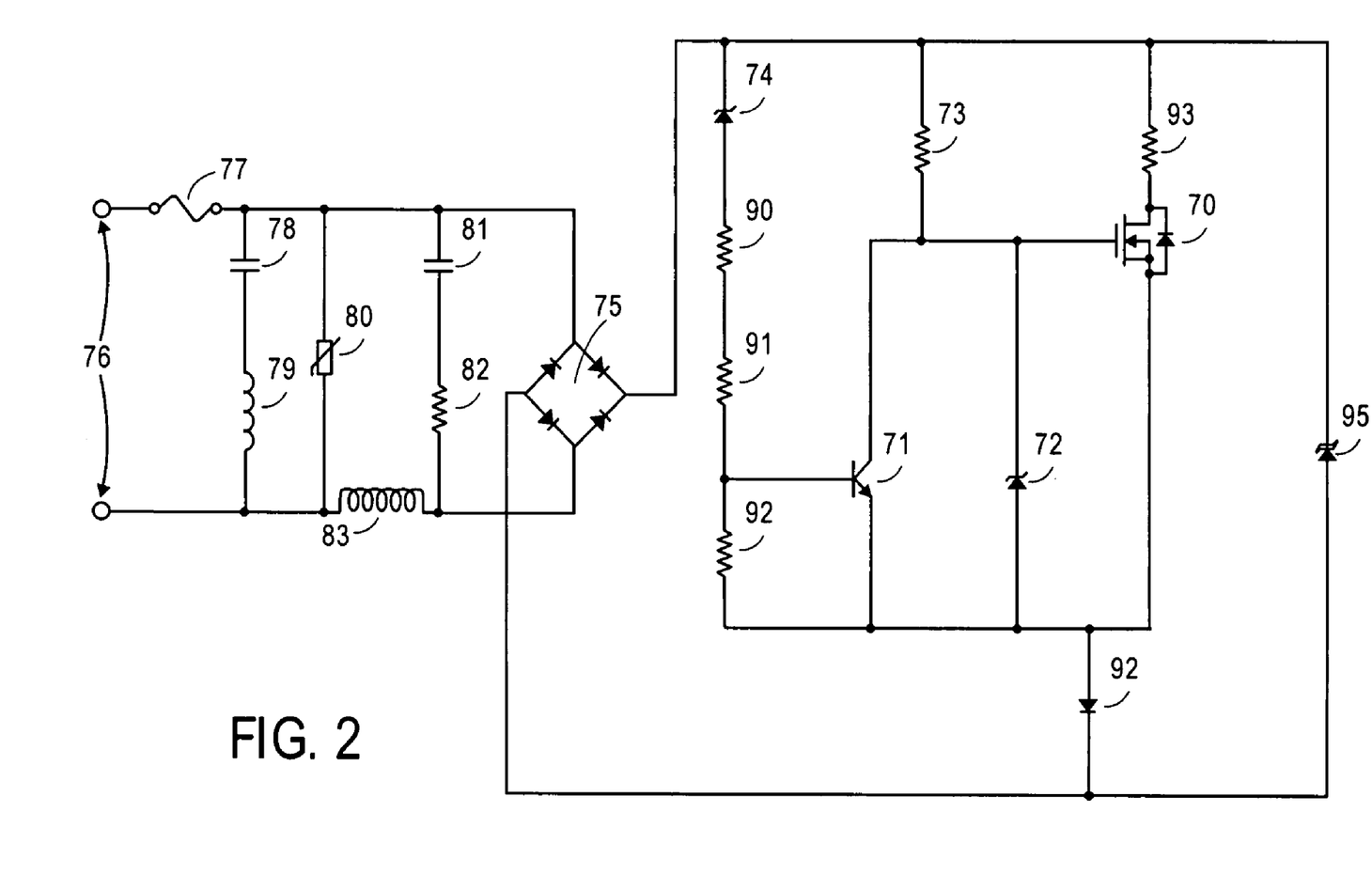
FIG. 2 is an electrical schematic of an embodiment of the present invention using an enhancement mode, field-effect transistor.

FIG. 2 is a more detailed schematic of the circuit 12 of FIG. 1 where a enhancement mode, field-effect transistor 70 (e.g. part number IRFBG20) is used. The circuit of FIG. 2 is coupled across a load, such as a bulb or other source of illumination at lines 76. An ordinary fuse 77 is used to protect the circuit. A high frequency bypass is provided through the capacitor 78 and inductor 79. This low impedance path for high frequency signals allows data transmitted over the power line to readily pass through the circuit. By way of example, this low impedance path is provided for signals at 130 kH. The capacitor 81, resistor 82 and inductor 83 comprise a filter to attenuate the switching transients associated with the circuit. These are used to meet power line emissions regulations. The metal oxide varister (MOV) 80 (e.g. part number ERZ-V07D471), diode 92 and Zener diode 95 (480 volt) are used to protect components in the circuit against large surge voltages which may occur on a power line.

In the circuit of FIG. 2, the diode bridge 75 rectifies the AC current across the load and this rectified signal is applied to the source and drain terminals of the transistor 70 through the resistor 93 and the diode 92. The gate terminal of the transistor 70 is coupled to the source terminal through the Zener diode 72 (10 volts). The collector terminal of the NPN transistor 71 (2N3904) has its collector terminal coupled to the diode bridge 75 through the resistor 73 and its emitter terminal coupled to the source terminal of the transistor 70. The base terminal of the transistor 71 is connected to the diode bridge through the Zener diode 74 (13 volts) and the voltage divider comprising resistors 90, 91 and 92 (e.g. each 100 k resistors). It will be appreciated that the specific transistors, resistor values and voltages are provided by way of example, and are not the only way in which the circuit may be fabricated.

With the circuit of FIG. 2, as the rectified voltage causes the gate of transistor 70 to be pulled positively through resistor 73, the transistor 70 conducts and provides a low impedance path for current through the circuit of FIG. 2. (Note that in all the circuits a bridge is used so that current is flowing in the proper direction through the switching device. If needed, an alternate implementation can be fabricated by also using a mirror image of the circuit of FIG. 2 without the diode bridge.) When the voltage from the bridge exceeds approximately 15 volts, the diode 74 begins to conduct pulling the base terminal of transistor 71 positive. As this continues, the transistor 71 conducts pulling low, the gate terminal of transistor 70. At this point, transistor 70 ceases to conduct and its gate is held low by the transistor 71, assuring that it is completely shut off. Thus, at a potential of approximately ±20 volts of the AC signal applied at line 76, the resistance of the circuit of FIG. 2 becomes high.

Figure 3:
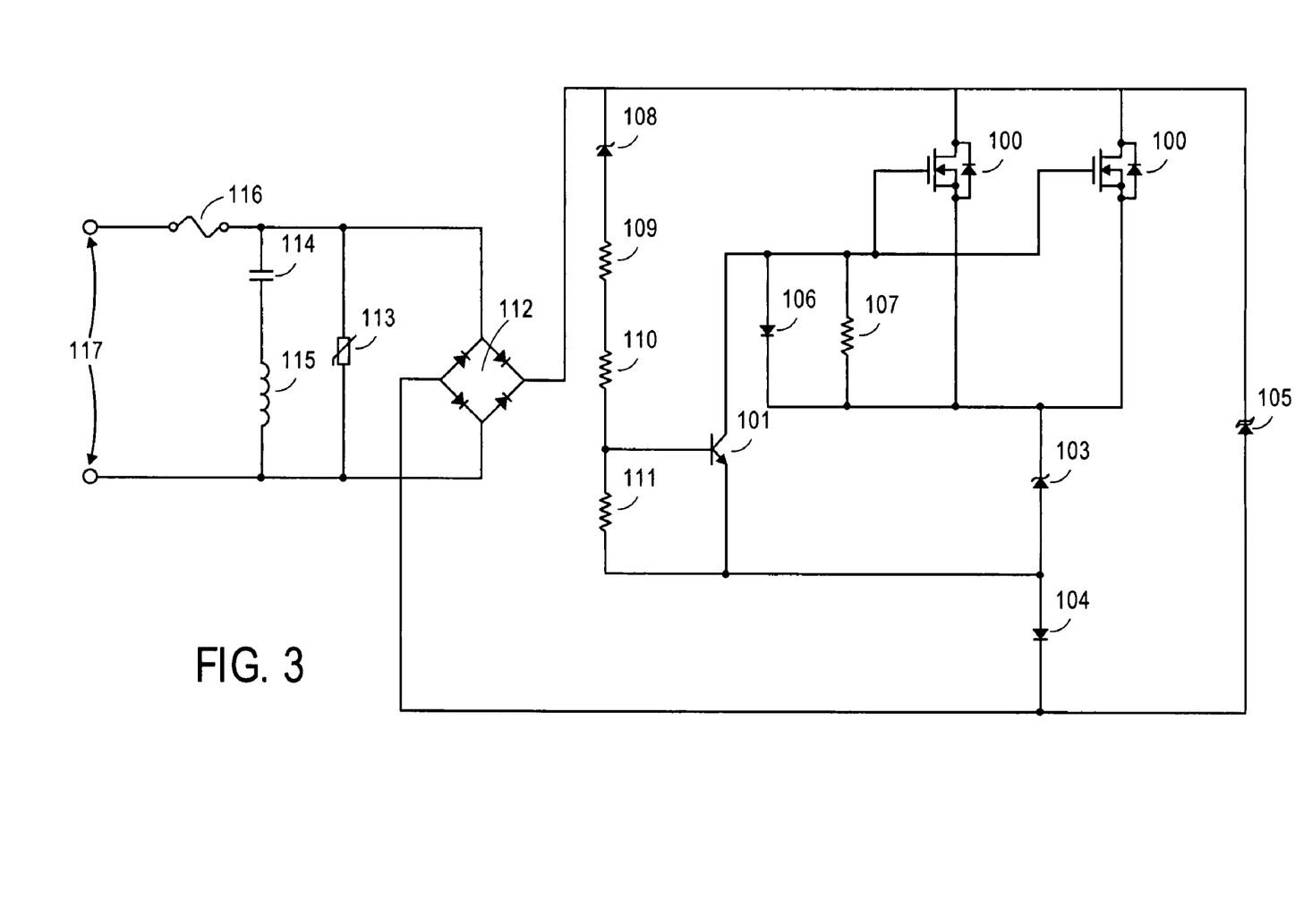
FIG. 3 is an alternate embodiment of the circuit of FIG. 2 using a depletion mode, field-effect transistor.

In the embodiment of FIG. 3, two depletion mode, field-effect transistors are used. The transistors 100 are connected in parallel and may be, for example, part number DN3545. The circuit again includes an NPN bipolar transistor 101 coupled to the gate of transistors 100. The emitter terminal of the transistor 101 is coupled to the source terminals of the transistors 100 through the Zener diode 103. The base terminal of the transistor 101 is connected to the diode bridge 112 through the voltage divider comprising the resistors 109, 110, 111 and the Zener diode 108. The drain terminals of the transistor 100 are also coupled to the diode bridge 112.

The lines 117 of the circuit of FIG. 3 are coupled across the load such as the bulb of FIG. 1. A fuse 116 is used to protect the circuit. A high frequency bypass path comprising capacitor 114 and inductor 115 again allows high frequency, communication signals to bypass the circuit. Component 113, diode 106, diode 104 and Zener diode 105 are used for circuit protection.

For the circuit of FIG. 3, as the potential across the bridge 112 begins to rise (after the zero crossing) the transistors 100 conduct since the gate terminals of transistors 100 are held at their source potential through the resistor 107. As the potential on the base terminal of transistor 101 rises, transistor 101 conducts pulling the gate terminals of transistors 100 towards −5 volts (Zener current of the diode 103). This turns off the transistors 100. Then, the circuit of FIG. 3 provides a high impedance for the rest of the half cycle of the AC waveform, as was the case with the circuit of FIG. 2.

Figure 4:
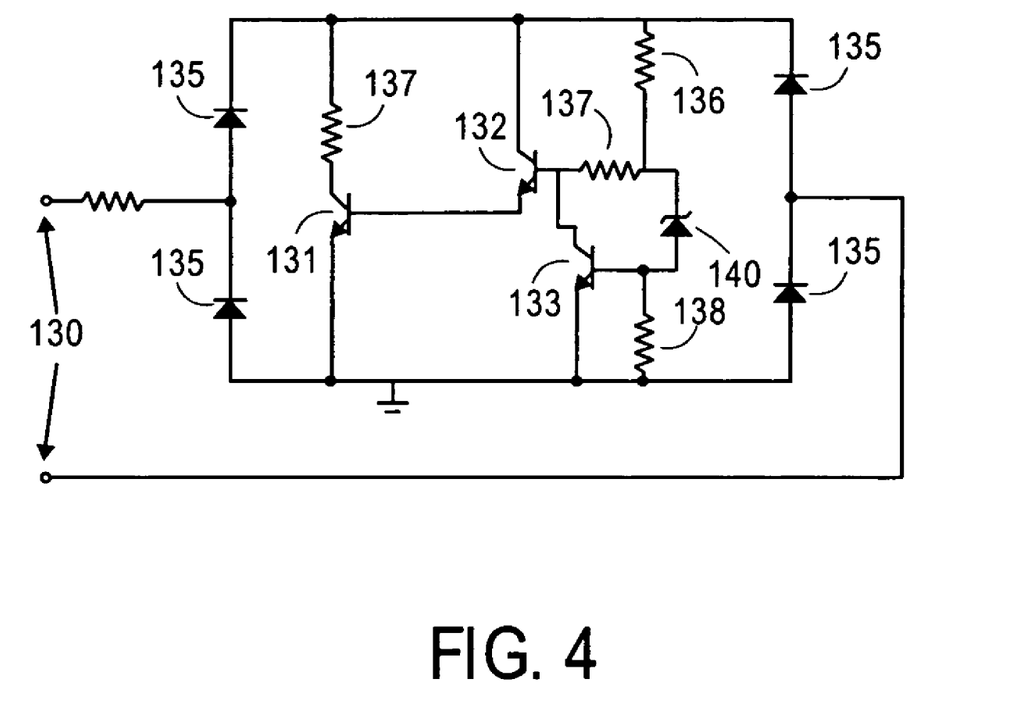
FIG. 4 is yet another embodiment of the circuit of FIG. 2 using bipolar transistors.

In FIG. 4, the circuit 12 of FIG. 1 is shown using bipolar transistors. The circuit of FIG. 4 is coupled across the load at lines 130. A full wave rectifying bridge employing diodes 135 rectifies the AC signal at lines 130.

The transistors 131 and 132 are connected in a Darlington connection such that the emitter current of transistor 132 is the base current for transistor 131. As the potential rises in an AC cycle at lines 130, it causes transistor 132 to conduct since the base terminal of transistor 132 senses the positive potential through the resistors 136 and 137. This causes the transistor 131 to conduct and provides a low impedance path through the transistor 131. As the potential continues to rise, the Zener diode 140 conducts causing the transistor 133 to conduct. When this occurs, transistors 131 and 132 are cut off, and the circuit of FIG. 3 provides only a high impedance for the rest of the half cycle of the AC waveform. Note that the resistors 136 and 138 provide a high impedance path when compared to the load.

Thus, a circuit has been described which provides a low impedance path near the zero crossing of an AC waveform and a high impedance throughout the remainder of the AC waveform when a load such as a light is on, and low impedance near the zero crossing when the load is off. The circuit, when used in conjunction with a switched leg power supply, allows the power supply to operate more effectively with higher voltage AC power sources (e.g. 240 volts) and with reactive loads (e.g. electronic ballast with fluorescent bulb).

What is claimed is:

1. A circuit for coupling across a load in an AC switched leg comprising:

a circuit component for providing a parallel, conductive path to the load, having less impedance than the load impedance when the voltage across the load is in a first range of an AC cycle; and a control coupled to the component for controlling the component such that the component has an impedance more than the load impedance when the voltage across the load is in a second range of the AC cycle, the second range providing a greater voltage to the load than the first range, wherein the first range is a relatively brief range compared to the AC cycle with the second range occupying most of the AC cycle.

2. The circuit of claim 1, wherein the AC cycle is a rectified AC signal which repeats every 180°.

3. The circuit of claim 1, wherein the component is an enhancement mode, field-effect transistor.

4. The circuit of claim 1, wherein the component is a depletion mode, field-effect transistor.

5. The circuit of claim 1, wherein the component is a bipolar transistor.

6. The circuit of claim 5, including a full wave rectifier coupled across the load such that the first and second ranges are of the same polarity.

7. The circuit of claim 1, 2, 3 or 4 wherein the control for controlling the component includes a bipolar transistor coupled to a control terminal of the component.

8. The circuit of claim 1 or 2, wherein the first range of the AC cycle is at or near the zero crossing of the AC cycle.

9. An apparatus for connecting across a source of light in an AC switched leg comprising:

a semiconductor component; and a control circuit for controlling the semiconductor component, such that the component has a first impedance during a first range of the AC cycle and a second impedance, higher than the first impedance during a second range of the AC cycle, wherein the first range is a relatively brief range compared to the AC cycle with the second range occupying most of the AC cycle.

10. The circuit of claim 9, wherein the AC cycle is a rectified AC signal which repeats every 180°.

11. The apparatus of claim 9, wherein the semiconductor component is an enhancement mode, field-effect transistor.

12. The apparatus of claim 9, wherein the semiconductor component is a depletion mode, field-effect transistor.

13. The apparatus of claim 9, wherein the semiconductor component is a bipolar transistor.

14. The apparatus of claim 9, 10, 11, 12 or 13 wherein the first range of the AC cycle is at, or near the zero, crossing of the AC cycle.

15. The apparatus of claim 9, 10, 11, 12 or 13, wherein the control circuit includes a bipolar transistor coupled to the gate of the field-effect transistor for switching the transistor from on to off, and from off to on.

16. The apparatus of claim 15, wherein the semiconductor component is coupled to a full wave rectifier.

17. A circuit for coupling across a light coupled to an AC power source comprising:

an enhancement mode, field-effect transistor having a source and drain terminal and a gate terminal;

a bipolar transistor having a base, collector and emitter terminal, the collector terminal being coupled to the gate terminal of the enhancement mode transistor;

a first Zener diode coupled between the gate and source terminals of the enhancement mode transistor;

a second Zener diode coupled between the drain terminal of the enhancement mode transistor and the base terminal of the bipolar transistor; and a full wave rectifier for providing a rectified signal between the drain terminal of the enhancement mode transistor and collector terminal of the bipolar transistor, and the source terminal of the enhancement mode transistor and emitter terminal of the bipolar transistor.

18. The circuit of claim 17, wherein the first Zener diode provides a voltage sufficiently high to bias the gate terminal with respect to the source terminal such that the enhancement mode transistor is strongly on.

19. The circuit of claim 18, wherein the threshold voltage of the second Zener diode is used to shut off the enhancement mode transistor when the AC signal applied to the full wave rectifier reaches a predetermined voltage.

20. A circuit for coupling across a light in an AC switched leg comprising:
  a depletion mode transistor having a drain and source terminals and a gate terminal;
  a bipolar transistor having a base, collector and emitter terminal, the collector terminal being coupled to the gate terminal of the depletion mode transistor;
  a first Zener diode coupled to the source terminal of the depletion mode transistor;
  a second Zener diode coupled between the drain terminal of the depletion mode transistor and the base terminal of the bipolar transistor; and
  a full wave rectifier for providing a rectified signal between the drain terminal of the depletion mode transistor and the emitter terminal of the bipolar transistor and first Zener diode.

21. The circuit of claim 20, wherein the first Zener diode provides a voltage sufficiently high to bias the gate terminal with respect to the source terminal of the depletion mode transistor such that the depletion mode transistor is strongly off.

22. The circuit of claim 21, wherein the threshold voltage of the second Zener diode is used for the bipolar transistor to shut off the depletion mode transistor when an AC signal applied to the full wave rectifier reaches a predetermined voltage.

23. A method for providing a current path around a load in an AC switched leg comprising:
  sensing the AC voltage across the load in the switched leg;
  providing a first impedance across the load when an AC cycle is in a first range; and
  providing a second impedance across the load when the AC cycle is in a second range, the second impedance being greater than the first impedance, wherein the first range is a relatively brief range compared to the AC cycle with the second range occupying most of the AC cycle.

24. The method of claim 23, wherein the sensing includes sensing the AC cycle following rectification.

25. The method defined by claim 24, wherein the steps of providing the first and second impedance comprises turning on and off a field-effect transistor.

26. A power supply in an AC switched leg having a load comprising:
  a first circuit coupled across the load for providing a first impedance when the AC potential across the load is near its zero volts, and a second impedance higher than the first impedance when the AC potential across the load is not near its zero volts; and
  a second circuit coupled across the switched leg having (i) a first device that provides a path across the switched legs and, (ii) a second device which when closed provides a path to a power supplied storage unit, and (iii) a control circuit coupled to the first and second devices for closing the second device to provide current to the power storage unit near zero volts and for assuring that the first device is open approximately when the second device is closed.

27. The power supply defined by claim 26, wherein the first circuit includes a field-effect transistor for providing the first and second impedance across the load.

28. The power supply defined by claim 26, wherein the first circuit includes a bipolar transistor for providing first and second impedances across the load.

29. A power supply in an AC switched leg, having a source of illumination, comprising:
  a first circuit means coupled across the source of illumination for providing a first relatively low impedance during at least one portion of an AC cycle, and a relatively high impedance during the remainder of the AC cycle; and
  a second circuit means coupled to the source of illumination and the first circuit means for storing energy during the at least one portion of the AC cycle when the first circuit means provides relatively low impedance.

30. The power supply defined by claim 29, wherein the at least one portion of the AC cycle occurs when the AC cycle is near a zero crossing.

31. The power supply of claim 30, wherein the second circuit means includes:
  a full wave rectifier, which rectifier is coupled across the AC leg during the at least one portion of the AC cycle; and
  a switch which is closed during the at least one portion of the AC cycle so as to couple current from the full rectifier to a capacitor.

* * * * *